Jan. 26, 1926.  1,570,941
J. G. CARROLL
AXLE FOR VEHICLES
Filed June 12, 1923  6 Sheets-Sheet 1

Witnesses:
W. F. Kilroy
Harry L. White

Inventor:
John G. Carroll
By Brown Boettcher & Dienner
Attys

Jan. 26, 1926.
J. G. CARROLL
1,570,941
AXLE FOR VEHICLES
Filed June 12, 1923    6 Sheets-Sheet 2
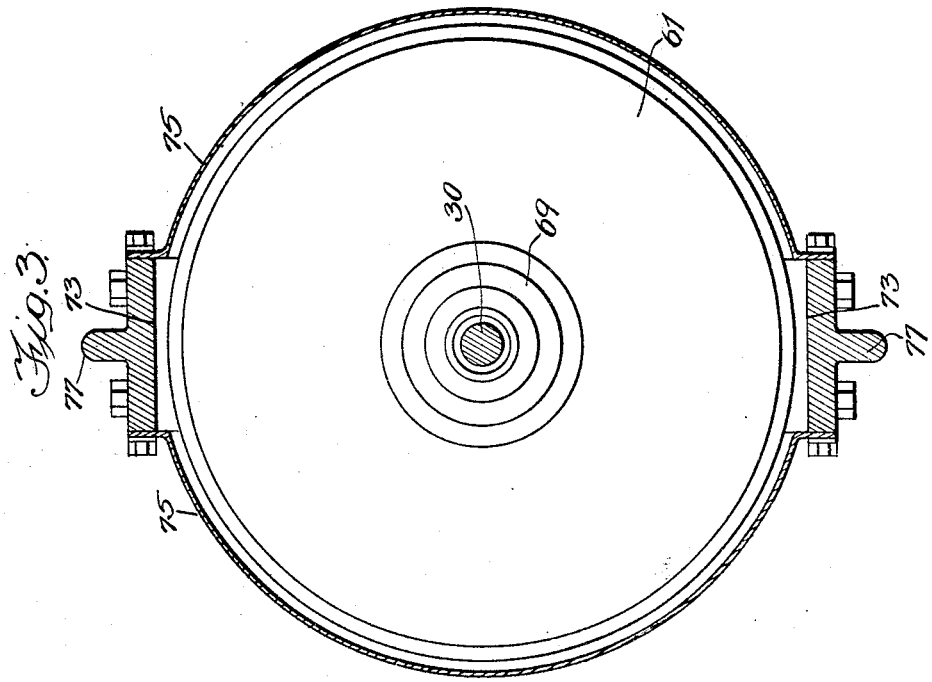
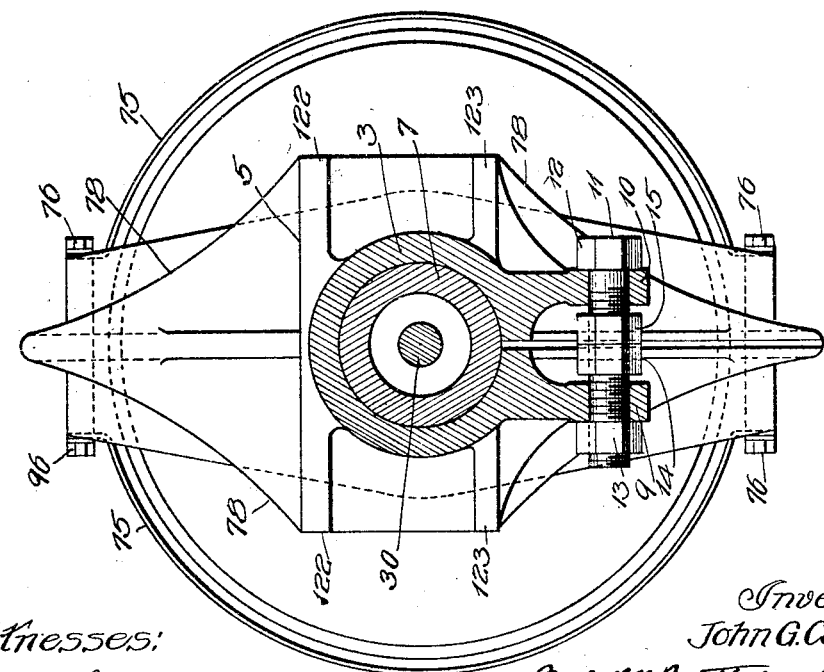
Witnesses:
W. F. Kilroy
Harry B. White
Inventor:
John G. Carroll
By Brown Boettcher and Dienner
Attys Jan. 26, 1926.　　　　　　　　　　　　　　　　　　1,570,941
J. G. CARROLL
AXLE FOR VEHICLES
Filed June 12, 1923　　　　6 Sheets-Sheet 3
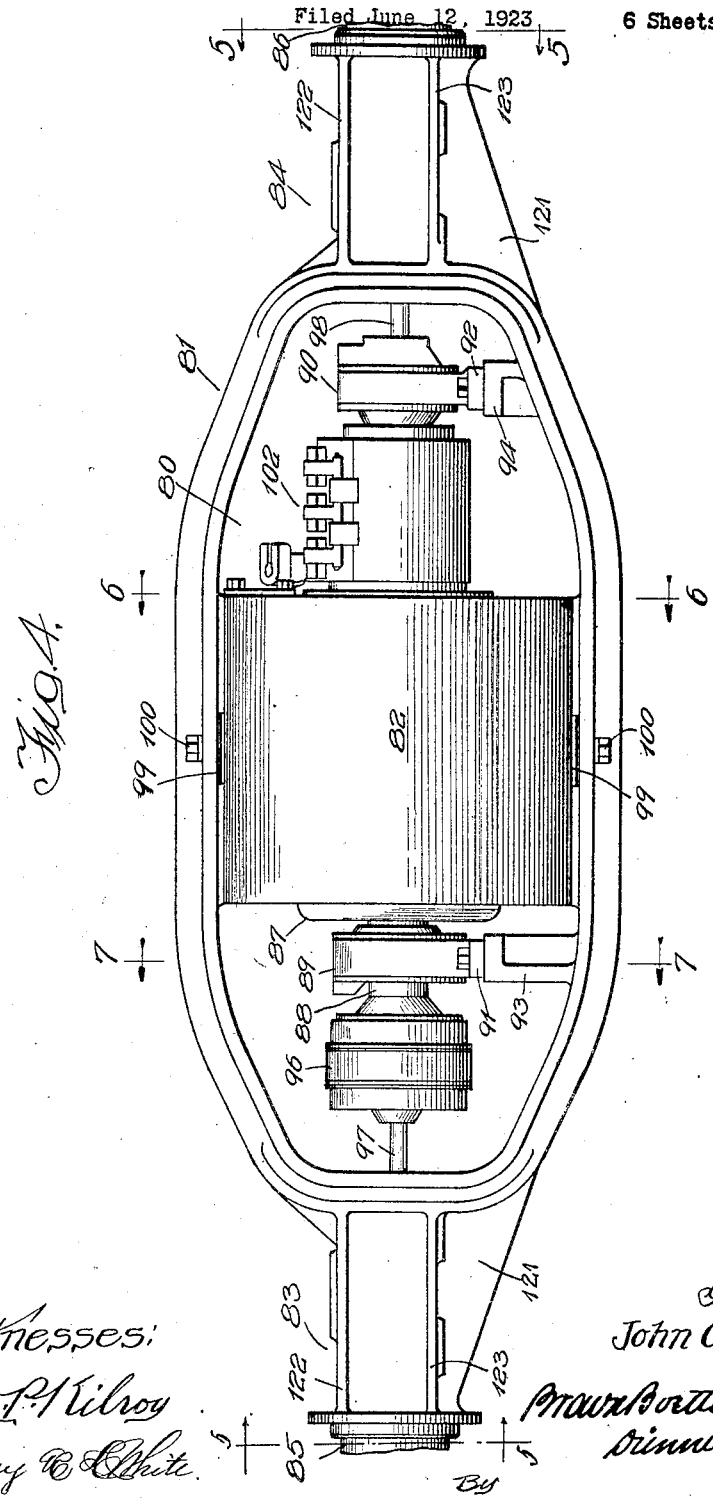

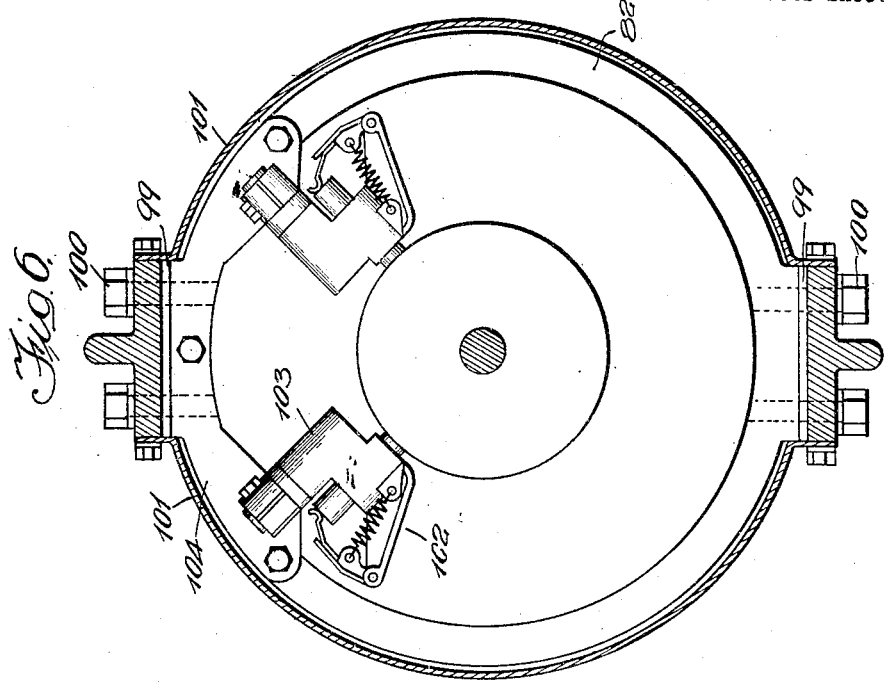
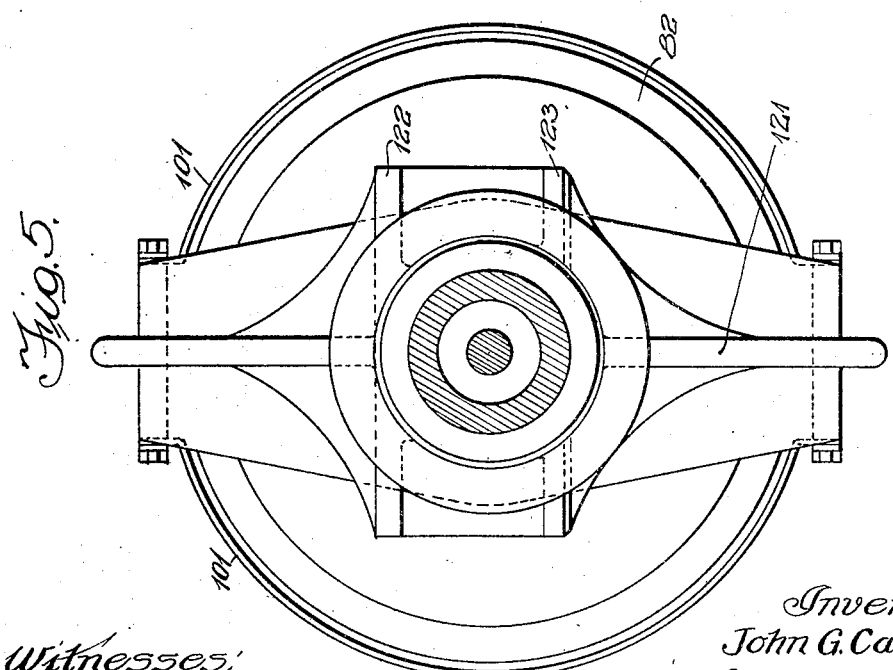

Jan. 26, 1926.
J. G. CARROLL
1,570,941
AXLE FOR VEHICLES
Filed June 12, 1923
6 Sheets-Sheet 5
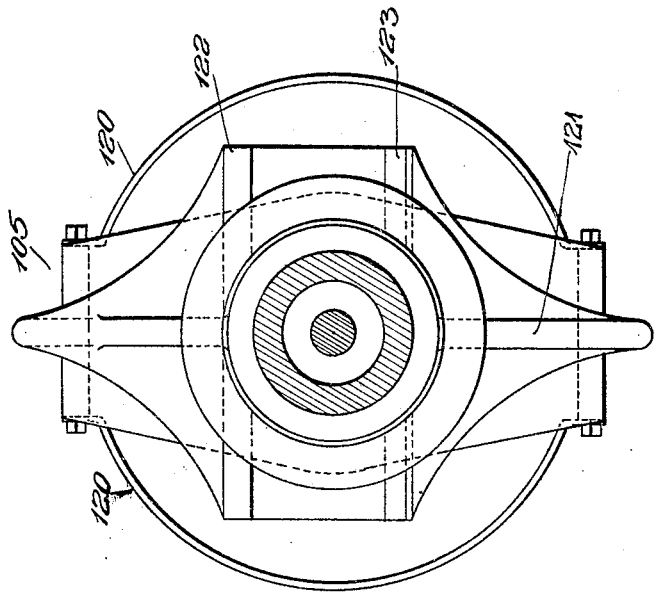
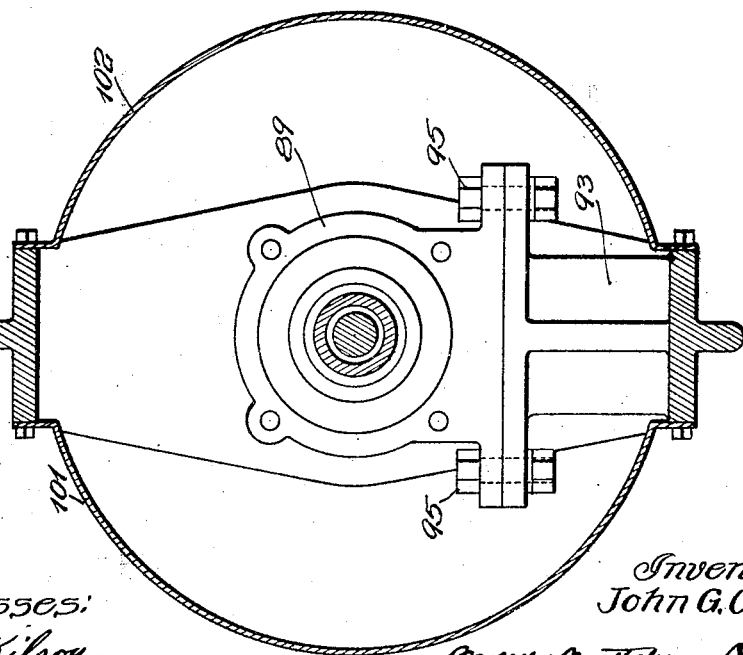
Witnesses:
W. F. Kilroy
Harry W. L. White
Inventor:
John G. Carroll
By Brown Boettcher Dienner
Attys.

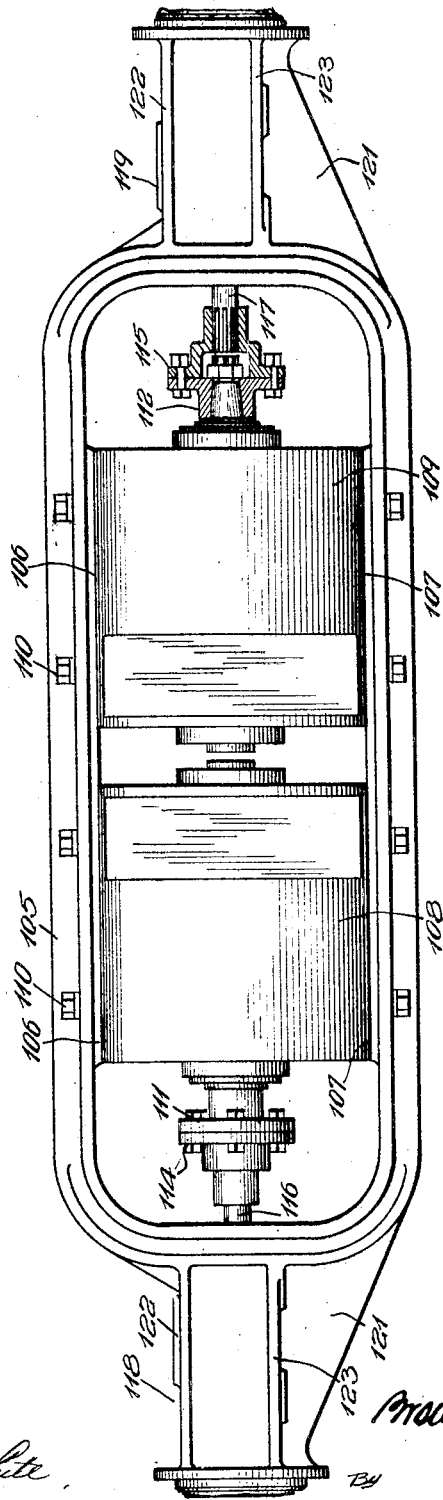

Patented Jan. 26, 1926.

1,570,941

UNITED STATES PATENT OFFICE.

JOHN G. CARROLL, OF CHICAGO, ILLINOIS, ASSIGNOR TO WALKER VEHICLE COMPANY, OF CHICAGO, ILLINOIS, A CORPORATION OF ILLINOIS.

AXLE FOR VEHICLES.

Application filed June 12, 1923. Serial No. 644,904.

*To all whom it may concern:*

Be it known that I, JOHN G. CARROLL, a citizen of the United States, residing at Chicago, in the county of Cook and State of Illinois, have invented a certain new and useful Improvement in Axles for Vehicles, of which the following is a full, clear, concise, and exact description, reference being had to the accompanying drawings, forming a part of this specification.

My invention relates to axles, particularly for electric vehicles.

While I shall describe my invention in connection with the "Walker drive", it is to be understood that the invention may be employed with other forms or types of drive or gear reduction.

It is desirable to use a minimum of unsprung weight in a vehicle and yet the axles must be rigid and amply strong. The rear axle is generally subject to the great stress, both because of the driving effort and because the major part of the load is carried over the same. Where the driving motor or motors are carried upon the rear axle, it is desirable that the same be housed against entry of dirt, moisture and other foreign matter.

Heretofore, it has been customary to provide a hollow rear axle housing, preferably of cast steel or cast iron, in which hollow housing the motor is mounted. This construction, I find, is not adapted to give either maximum strength or accessibility. Furthermore, I have discovered that the disposition of a metal in a relatively thin cylindrical shell makes it peculiarly liable to fracture by puncturing. That is to say, a blow against the side wall of the hollow housing at any point is peculiarly liable to rupture the walls of the housing and thus start a fault which will quickly develop into complete breakage.

According to my invention I provide an axle construction in which the metal of the axle is disposed so as to give greater strength and perform the function of housing the motor by a supplemental shell. In addition to a better disposition of the actual metal of the axle itself, I place the frame of the motor or motors in such a position that such frame actually becomes a strengthening element or strut in the axle itself, and instead of being a mere dead load, adds greatly to the strength of the axle.

There are certain other and incidental advantages and objects which will be apparent from the following detailed description. In order to acquaint those skilled in the art with the manner of constructing and operating my invention, I shall now describe the same in connection with the accompanying drawings in which:

Fig. 2 is a vertical cross section taken on the line 2—2 of Fig. 1;

Fig. 3 is a similar view taken on the line 3—3 of Fig. 1;

Fig. 4 is a side elevational view of a modified form of axle, the housing being removed to reveal the location of the motor and differential;

Fig. 5 is a transverse vertical section taken on the line 5—5 of Fig. 4;

Fig. 6 is a similar cross sectional view taken on the line 6—6 of Fig. 4;

Fig. 7 is a similar transverse section taken on the line 7—7 of Fig. 4 to show the location of the bearing and pedestal therefor;

Fig. 8 is an end view and Fig. 9 a side elevational view of a further modified form of rear axle embodying the invention.

Figure 1:
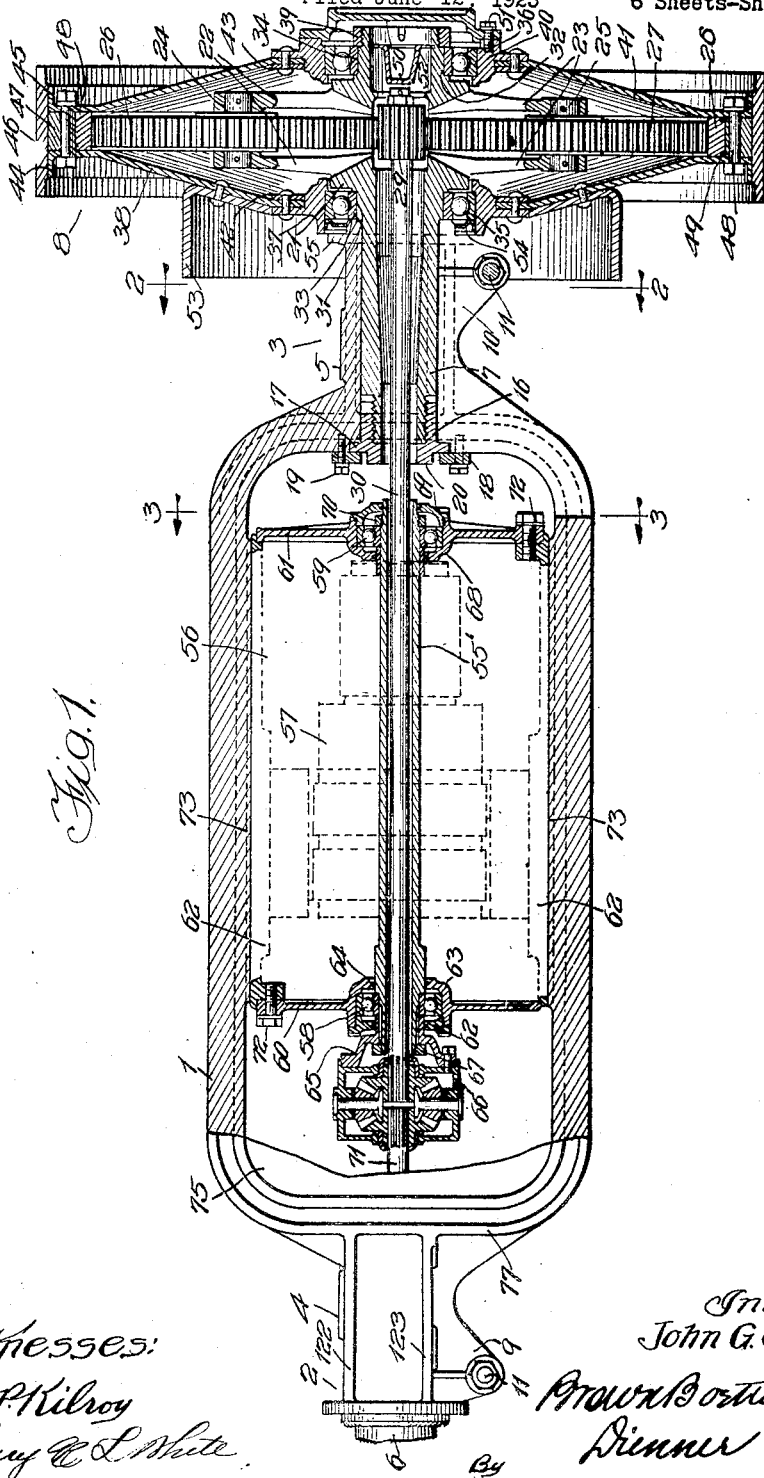
Fig. 1 is a longitudinal vertical section of a rear axle embodying my invention.

Referring now to the embodiment of Figs. 1, 2 and 3, the axle of my invention comprises the open frame portion 1 which somewhat remotely resembles the usual banjo frame of automobile construction, and stub end portions 2 and 3 which are adapted to support the springs of the vehicle upon corresponding spring pads 4 and 5, and are adapted further to receive the sleeves or stub axle sections 6 and 7 upon which the wheels, such as 8, are mounted. I have shown only the right hand wheel and connected parts. It will be understood that a similar or other form of wheel may be mounted upon the left end of the axle. The hollow ends 2 and 3 of the axle are bored out to fit the stubs or sleeves 7 and are slotted or split at the ends down to the open frame portion and provided with pairs of depending clamping lugs or ears 9 and 10, more clearly shown in Fig. 2. These lugs 9 and 10 are drilled to receive the bolts 11, which passes freely through them. The bolt 11 is threaded for the major portion of its length and bears upon its one end the integral head 12, and upon the other end the nut 13 by which means the two lugs or ears 9 and 10 may be drawn towards each other to shrink the split stubs 2 and 3 upon the corresponding axle stubs 6 and 7.

In order to facilitate the insertion of the axle stubs, such as 7 and 8, into the housing stubs 2 and 3, I provide a pair of threaded nuts 14 and 15 upon the bolt 11. By threading these nuts 14 and 15 apart on the bolt 11, they operate as an expander or strut between the ears or lugs 9 and 10 and expand the housing stub or sleeve 3, or 2, as the case may be, to facilitate the insertion of the corresponding axle stub or the removal of the same. To assist in the insertion or removal of a stub axle, such as 6 or 7, I have provided in addition the threaded collar 16 which lies in the rear end of the bore of the axle stub 2 or 3, and has internal or female threads engaging the external or male threads formed on the rear or inner end of the corresponding axle stub 7. The collar 16 has a flange 17 which lies under the annular plate or ring 18, this plate or ring being held upon the inner end surface of the frame 1 by means of cap screws and spring washers 19. The exposed end 20 of the nut 16 is formed with suitable faces for the engagement of a wrench or other suitable tool to turn the nut for either drawing the axle stub 7 into place or for forcing the same out of the housing stub 3.

The axle stub 7 at its outer end bears a double yoke member 21 having two pairs of arms 22 and 23, carrying idler shafts 24 and 25, respectively. Upon these shafts are mounted the idlers 26 and 27 meshing at their outer sides with the annular ring gear 28, and at their inner and adjacent sides with the driving pinion 29. The pinion 29 is secured by a key and by a taper fitting upon the outer end of the driving spindle 30. The yoke member 21 has annular shoulders providing seats 31 and 32 for the inner races 33 and 34 of the inner and outer bearings 35 and 36. The bearing race 31 is held between the end of the housing stub 3, and the inner edge of the shoulder on the yoke member 21. The drawing up of the nut 16 to pull the axle stub 7 into place, brings the outer end of the housing stub 3 against the inner edge of the inner bearing race 33 and holds it firmly against the enlarged portion of the yoke 21.

The outer race of the corresponding bearing 35 is seated in an annular seat in a metal ring 37 to which is attached the inner disk 38 of the wheel 8.

The inner bearing race 34 of the outer bearing 36 is clamped between the large portion of the yoke 21, and a threaded clamping ring 39 which is centered upon the outer end of the yoke member. The outer bearing race of this bearing 36 is mounted in a flanged metal ring 40, which is similar to the inner ring 37. To this outer ring 40 the outer wheel disk 41 is similarly attached. These disks 38 and 41 are preferably riveted to the flanges of the corresponding rings between such flanges and loose riveting rings 42 and 43 upon the interior of the disks. At their outer peripheries the disks 38 and 41 are flanged, as indicated at 44 and 45 to lie against the inner periphery of the rim 46. This rim 46 has a ring 47, upon which the same is shrunk, the ring 47 being separate from the ring gear 26, but the two parts being keyed together held in assembly by the clamping bolts 48. The bolts 48 at the same time clamp the outer portions of the disks 38 and 41 against the ring gear 26 and the ring or felly 47 holding the ring gear, the felly and the rim and the disks in place and in adding them firmly and mechanically. The ring gear 26 is provided with annular grooves 49 in which packing material is placed so that a secure joint between the disks 38, 41 and the ring gear 28 is secured, so that grease or other lubricant may be kept in the wheel for lubricating the gears. A suitable cap 50 closes the outer ring 40, this cap being secured to the ring by bolts 51. Displacement of the driving spindle 30 is prevented by means of the spring 52 which snaps into a groove in the outer end of the yoke member 21. The inner disk 38 has a brake drum 53 attached thereto, this brake drum cooperating with the usual brakes for stopping or holding the car. A pressed metal ring 54 lies in the space between the flange 55 and the extension of the inner ring or hub portion 37 to keep foreign material out of the inner bearing 36.

The spindle 30 extends through a sleeve or quill 55', which sleeve or quill is the shaft of the motor 56 upon which the armature 57 is mounted. This sleeve or quill is suitably supported in anti-friction bearings 58 and 59, supported in the end plates 60 and 61 of the motor frame 62. The bearings 58 and 59 are mounted as follows: The outer race of the bearing 58 is mounted in a hollow hub, one side of which is integral with the web of the end plate 60, and the other end of which is formed of a ring 62 threaded into the open end of the hub and holding the outer race between said ring 62 and the opposite integral part 63. The inner race of the bearing 58 is held between a collar 64 which may be formed integral on the quill or sleeve 55, and the hub of the driving flange 65, which driving flange is connected to the differential 66. The hub of the driving flange is keyed to the quill or sleeve 55 by suitable splines and held in place by the nut or threaded ring 67.

The races of the bearing 59 are held in a similar manner. The outer race is held between the integral portion 63 of the hub on the end plate 61, and the inner end of the threaded retaining ring 69 which is threaded into the open end of said hub. The inner race is held between a pair of collars on the quill or sleeve 55, the outer one of these collars 70 being threaded upon the end of the quill or sleeve 55.

The driving spindle 30 which passes through the quill or sleeve 55 is suitably splined for driving engagement with the adjacent bevel gear of the differential 66, and the driving spindle 71 for the wheel at the opposite end of the axle is similarly splined into its adjacent bevel gear in the differential 66. The end plates 60 and 61 are drawn up tight against the ends of the field frame 62 as by means of suitable cap screws or studs 72. The interior surface of the open frame portion 1 provides opposed flat seats, which are suitably machined to receive cooperating flat faces on the driving motor 56. The field frame 62 thus serves the function of a post or strut between the opposite sides of the open frame 1, adding considerable strength and rigidity to the axle. The opposite sides of the open frame 1 are closed by means of pressed sheet metal housings or covers 75, which covers are held in place by suitable cap screws 76. The open frame is preferably formed with the external rib or flange 77 at top and bottom to strengthen the same. Also at the stub ends of the axle housing 2 and 3, additional lateral ribs, such as indicated at 78 join the ends of the spring seat with the open frame portion in order to add strength at the juncture.

Referring now to the modification shown in Figs. 4, 5, 6 and 7, I wish to point out that the bearings for the motor, shown at 80, may be mounted on the open frame member 81 instead of upon the sealed frame 82 of the motor. In this case the stub ends 83 and 84 may be like the ones shown in connection with the prior embodiment, or they may be varied to receive the axle stubs 85 and 86 for mounting the driving wheels. The armature 87 of the motor 80 is mounted upon a sleeve 88, which sleeve or quill is mounted in the anti-friction bearings 89 and 90. These bearing members 89 and 90 are provided with clamping seats 91 and 92, which are bolted to pedestals 93 and 94 integral with the open frame 81. These bearings 89 and 90 are clamped down upon the flat tops of the pedestals 93 and 94 by means of suitable cap screws or studs 95. The frames of the bearings 89 and 90 have plates secured to the opposite sides thereof for the dual purpose of retaining the races and for retaining lubricant in said races.

The quill or sleeve 88 extends out to the housing of a differential gear 96 and is through said differential gear 96 connected to the driving spindles 97 and 98 for driving the wheels.

The frame 82 of the motor has flat top and bottom surfaces cooperating with flat bottom and top surfaces on the interior of the open frame 81, these parts being gained into each other, as indicated at 99, and being clamped together by suitable bolts or cap screws 100. Suitable pressed steel or other sheet metal housings 101, like the housings 75, are clamped against the sides of the axle member to form an enclosure for the motor. The brushes for the motor indicated at 102 are mounted upon a brush holder 103, which in turn is secured by means of a plate 104 to the field frame 82, but suitably insulated therefrom. As to the other features not specifically described, this axle is like the previous embodiment.

In Figs. 8 and 9 I have illustrated a double motor axle in which two motors are employed, one for each spindle instead of employing a single motor and a differential. In this case, the open frame member 105 is provided with a relatively long seating surface at 106 and 107 for seating the two motors 108 and 109, which motors have corresponding faces on their field frames at top and bottom, so that they may be clamped in the open frame as by means of the bolts or screws 110. Each motor has an armature shaft mounted in suitable bearings in the frame of the motor, and these armature shafts are connected as by means of coupling flanges 111 and 112 to cooperating coupling flanges 114 and 115, which in turn are suitably splined to receive the spindles 116 and 117. The frame 105 has stub ends 118 and 119 which may be constructed as in the previous embodiment. Similarly, there are pressed sheet metal housings or covers 120 for closing the open sides of the open frame 105.

It will be understood that the axle may be made of cast metal or may be made of forged metal, as desired. In the embodiments of Figs. 4 to 7 and 8 to 9, inclusive, special webs 121 join the bottom part of the open frame with the bottom part of the stub ends. Spring seats are provided at the top side of the stub ends and laterally extending strengthening flanges, indicated at 122 and 123, in all of these forms tend to strengthen the stub ends against fore-and-aft stresses.

I do not intend to be limited to the precise details shown or described, as the details may be varied within the scope of the appended claims. I do, however, intend to claim broadly the feature of employing the motor frame as an element of the axle frame for strengthening the same and for properly locating said motor frame. I further intend to claim broadly the means for pulling in and pushing out the stub axle, and also the means for spreading or shrinking the stub end of the housing to permit more ready insertion or to clamp the stub axle.

While I have described the invention in connection with the use of an electric motor between the top chord and the bottom chord of the open frame, it will be understood that the invention is not necessarily confined to the use of an electric motor in this position, as any other driving means which has a suitable shell or frame work, and which may be clamped between and to said top and bottom chords may be employed instead.

I claim:—

1. In combination, an axle having an open frame portion, and an end portion, a driving spindle extending through said end portion, a wheel on said end portion actuated by said driving spindle, and a motor having a field frame mounted in said frame and serving as a mechanical connection between the sides of the frame.

2. In an axle, the combination of a frame member having a top chord and a bottom chord united at their ends to each other and to housing stubs, wheels mounted on said stubs, spindles passing through said stubs and connected to said wheels, and driving means for said spindles mounted between and clamped to said chords to form a mechanical connection between them.

3. In combination, a rear axle frame comprising a central frame member including a top chord and a bottom chord, end portions joining said chords and forming hollow sleeves adapted to provide pockets for actual stubs, clamping means for said hollow sleeves, the opposed surfaces of said chords comprising flat parallel faces.

4. A rear axle frame comprising a central open frame member and tubular end portions, the inner surfaces of said open frame member being finished, and a driving member having a housing or shell clamped against and between said opposed surfaces.

5. A rear axle comprising an open frame having a top chord and a bottom chord, said chords having opposed clamping faces, integral end portions having sockets for receiving axle stubs, clamping means for shrinking said sockets upon the axle stubs, spring seats on said end portions and laterally extending flanges for strengthening said end portions against fore-and-aft stresses.

6. A rear axle comprising an open frame having a top chord and a bottom chord, said chords having opposed clamping faces, integral end portions having sockets for receiving axle stubs, clamping means for shrinking said stubs upon the axle sockets, spring seats on said end portions and laterally extending flanges for strengthening said end portions against fore-and-aft stresses.

7. A rear axle comprising an open frame having a top chord and a bottom chord, said chords having opposed clamping faces, integral end portions having sockets for receiving axle stubs, clamping means for shrinking said stubs upon the axle sockets, spring seats on said end portions and laterally extending flanges for strengthening said end portions against fore-and-aft stresses, and screw threaded means carried by the axle for forcing an axle stub into or out of said socket.

8. In a device of the class described, a central open frame member having a tubular extension, said tubular extension being slotted, flanges along the edges of the slot, a bolt passing transversely through the flanges, a nut for the bolt lying outside of one of the flanges, and a pair of nuts for the bolt lying between said flanges.

9. In a device of the class described, a central open frame member having a top chord and a bottom chord, said chords having opposed clamping faces, tubular extensions to which said chords are connected, live spindles passing through said extensions, and driving means having a substantially cylindrical shell clamped between said opposed faces of the chords.

10. In combination, an open frame member comprising a top chord, a bottom chord and tubular members, and a pair of electric motors having field frames, said frames being clamped between and to said chord members and having driving shafts extending through said tubular extensions.

11. In combination, a rear axle frame comprising a central frame member including a top and a bottom chord, end portions forming hollow sleeves joining said chords a motor adapted for mounting on said frame member and relatively semi-circular sheet metal covers fastened to each side of said chords to form a housing for said motor.

12. In combination, a rear axle frame comprising a top and bottom chord united at their ends to each other, a motor having a field frame mounted between said top and bottom chords, and relatively semi-circular covers fastened to each side of said chords to form a housing.

In witness whereof, I hereunto subscribe my name this eighth day of June, 1923.

JOHN G. CARROLL